(12) United States Patent
Zander et al.

(10) Patent No.: US 10,461,837 B2
(45) Date of Patent: Oct. 29, 2019

(54) METHOD AND SYSTEM FOR ALLOCATING RESOURCES FOR RELAYING CHANNELS IN CELLULAR NETWORKS

(71) Applicant: Sony Mobile Communications Inc., Tokyo (JP)

(72) Inventors: Olof Zander, Södra Sandby (SE); Basuki Priyanto, Lund (SE); Vanja Plicanic Samuelsson, Lund (SE); Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/015,950

(22) Filed: Feb. 4, 2016

(65) Prior Publication Data

US 2016/0286567 A1    Sep. 29, 2016

Related U.S. Application Data

(63) Continuation of application No. PCT/EP2015/070348, filed on Sep. 7, 2015, which is
(Continued)

(51) Int. Cl.
*H04B 7/15* (2006.01)
*H04W 72/12* (2009.01)
*H04B 7/155* (2006.01)

(52) U.S. Cl.
CPC ........... *H04B 7/15* (2013.01); *H04B 7/15542* (2013.01); *H04W 72/121* (2013.01)

(58) Field of Classification Search
CPC ... H04W 16/26; H04W 84/047; H04W 88/04; H04W 72/0453; H04W 4/06; H04W 72/00; H04W 16/06; H04W 72/02; H04W 72/0406; H04W 72/08; H04W 72/1242; H04B 7/2606; H04B 7/026; H04B 7/155; H04B 7/15542; H04B 7/14;
(Continued)

(56) References Cited

U.S. PATENT DOCUMENTS 7,957,347 B1    6/2011  Loc
2002/0034956 A1   3/2002  Mekuria
(Continued)

FOREIGN PATENT DOCUMENTS

EP    2612519 A1    7/2013
EP    2 670 206 A1  12/2013
WO    2010/006649 A1  1/2010

OTHER PUBLICATIONS

International Search Report and Written Opinion from counterpart International Patent Application No. PCT/EP2015/070348, dated May 30, 2016.
(Continued)

*Primary Examiner* — Allahyar Kasraian
(74) *Attorney, Agent, or Firm* — Tucker Ellis LLP

(57) ABSTRACT

First reoccurring resources on a radio link of a cellular network are allocated to the first relaying channel. Second reoccurring resources on the radio link are allocated to a second relaying channel. The first reoccurring resources are shared between communication devices assigned to a first set; the second reoccurring resources are shared between communication devices assigned to a second set. The first reoccurring resources, in some embodiments, may be orthogonal to the second reoccurring resources.

14 Claims, 10 Drawing Sheets

Related U.S. Application Data a continuation-in-part of application No. PCT/EP2015/056553, filed on Mar. 26, 2015, and a continuation-in-part of application No. PCT/EP2015/056375, filed on Mar. 25, 2015.

(58) Field of Classification Search
CPC .. H04B 7/15592; H04B 7/15; H04B 7/15557; H04B 7/15507
USPC ........ 455/11.1, 13.1, 16; 370/226, 243, 246, 370/274, 279, 293, 315, 316, 492, 501
See application file for complete search history.

(56) References Cited

U.S. PATENT DOCUMENTS

| | | |
|---|---|---|
| 2002/0128017 A1 | 9/2002 | Virtanen |
| 2003/0072274 A1 | 4/2003 | Futakata et al. |
| 2003/0093485 A1 | 5/2003 | Dougall et al. |
| 2003/0103492 A1 | 6/2003 | Tanimoto |
| 2004/0057407 A1 | 3/2004 | Balachandran et al. |
| 2004/0198345 A1 | 10/2004 | Farber et al. |
| 2005/0226198 A1 | 10/2005 | Barak et al. |
| 2008/0225783 A1 | 9/2008 | Wang |
| 2008/0300004 A1 | 12/2008 | Balachandran et al. |
| 2009/0034506 A1 | 2/2009 | Wijayanathan et al. |
| 2009/0201846 A1 | 8/2009 | Horn |
| 2011/0117907 A1 | 5/2011 | Hooli et al. |
| 2011/0134827 A1* | 6/2011 | Hooli ............... H04W 72/04 370/315 |
| 2011/0235571 A1* | 9/2011 | Seo ............... H04B 7/15542 370/315 |
| 2011/0264977 A1 | 10/2011 | Chen et al. |
| 2012/0142363 A1 | 6/2012 | Elmaleh et al. |
| 2012/0208583 A1 | 8/2012 | Chung et al. |
| 2013/0005329 A1 | 1/2013 | Kawasaki |
| 2013/0022029 A1 | 1/2013 | Ryu et al. |
| 2013/0163508 A1* | 6/2013 | Yu ............... H04W 16/14 370/315 |
| 2013/0190000 A1* | 7/2013 | Boudreau ............ H04W 16/26 455/449 |
| 2014/0010212 A1 | 1/2014 | McNamara |
| 2014/0171062 A1 | 6/2014 | Fallgren et al. |
| 2014/0321367 A1 | 10/2014 | Marupaduga |
| 2015/0029866 A1 | 1/2015 | Liao et al. |
| 2015/0189645 A1 | 7/2015 | Maeda et al. |
| 2015/0237649 A1 | 8/2015 | Zhang et al. |
| 2016/0050075 A1 | 2/2016 | Rubin et al. |
| 2016/0219596 A1 | 7/2016 | Yanover et al. |
| 2017/0013643 A1* | 1/2017 | Nan ............... H04W 74/006 |
| 2017/0085573 A1 | 3/2017 | Zhang et al. |
| 2018/0167176 A1 | 6/2018 | McNamara et al. |

OTHER PUBLICATIONS

Yi Zheng et al., "Performance Analysis of Scheduling Algorithms in the relay-aided Cellular Networks," Communications, Circuits and Systems (ICCCAS), 2010 International Conference, IEEE, Jul. 28, 2010, pp. 122-125.

CATT: "Discussion on UE-to-Network Relays Operation," R1-151353, 3GPP TSG RAN WG1 Meeting #80bis, Belgrade, Serbia Apr. 20-24, 2015.

International Search Report and Written Opinion from counterpart International Patent Application No. PCT/EP2015/056553, dated Nov. 26, 2015.

International Search Report and Written Opinion from counterpart International Patent Application No. PCT/EP2015/056375, dated Nov. 26, 2015.

Fanzhao Wang et al., "Adaptive Relaying Method Selection for Multi-Rate Wireless Networks with Network Coding," IEEE Communications Letters, vol. 16, No. 12, Dec. 1, 2012, pp. 2004-2007.

Chu Thi My Chinh et al., "Adaptive Modulation and Coding with Queue Awareness in Cognitive Incremental Decode-and-Forward Relay Networks," 2014 IEEE International Conference on Communications (CCC), Jun. 10, 2014, pp. 1453-1459.

3GPP TR 23.713 V1.0.0, 3rd Generation Partnership Project; Technical Specification Group Services and System Aspects; Study on extended architecture support for proximity-based services (Release 13), (Feb. 2015).

3GPP TS 23.401 V132.0,3rd Generation Partnership Project; Technical Specification Group Services and System Aspects; General Packet Radio Service (GPRS) enhancements for Evolved Universal Terrestrial Radio Access Network (E-UTRAN) access (Release 13), (Mar. 2015).

3GPP TS 24.008 V13.1 .0,3rd Generation Partnership Project; Technical Specification Group Core Network and Terminals; Mobile radio interface Layer 3 specification; Core network protocols; Stage 3 (Release 13), (Mar. 2015).

Office Action from corresponding U.S. Appl. No. 14/806,319, dated Nov. 21, 2017.

* cited by examiner

METHOD AND SYSTEM FOR ALLOCATING RESOURCES FOR RELAYING CHANNELS IN CELLULAR NETWORKS

RELATED APPLICATION DATA

This application is a continuation of International Application No. PCT/EP2015/070348, filed Sep. 7, 2015, which is a continuation-in-part of International Application Nos. PCT/EP2015/056553, filed Mar. 26, 2015, and PCT/EP2015/056375, filed Mar. 25, 2015, the disclosures of which are incorporated herein by reference in their entireties.

TECHNICAL FIELD

Various embodiments relate to techniques of allocating, for different sets of communication devices, resources on a radio link of a cellular network. The sets are associated with different relaying channels.

BACKGROUND

With the ever increasing number of communication devices or user equipment (UEs) connected to cellular networks, also the amount of traffic on radio link of cellular networks is expected to grow further. In particular, with respect to machine type communication (MTC), it is possible that—while the overall traffic and number of devices increase—the amount of traffic per device decreases.

An MTC device is typically a device with a low to moderate requirement on data traffic volumes and loose latency requirements. Additionally, communication employing MTC devices should achieve low complexity and low costs. Further, energy consumption of an MTC device should be comparably low in order to allow battery-powered devices to function for a comparably long duration: The battery life should be sufficiently long. Further, interference mitigation is within the focus of networks where a large number, up to billions, of MTC devices are connected (Internet of Things). Also, for MTC devices the system coverage should be comparably high.

In particular in such scenarios, employing shared reoccurring resources on the radio link is a viable option to handle the increasing traffic. Typically, the shared reoccurring resources are prospectively allocated to a plurality of communication devices connected to the cellular network and are persistent for a certain period of time.

However, typically employing shared resources causes an increased likelihood of collisions between multiple devices trying to send at the same moment in time. Collision can increase latency of transmission, increase a need for control signaling, and can, therefore, reduce the overall user experience and reduce the system/network capacity.

SUMMARY

Therefore, a need exists for advanced techniques of employing reoccurring resources on the radio link. In particular, a need exists for techniques that allow to flexibly schedule resources for a large number of UEs—while, at the same time, a likelihood of collisions is kept comparatively small.

This need is met by the features of the independent claims. The dependent claims define embodiments.

According to an aspect, a node of a cellular network is provided. The node comprises an interface configured to communicate with a plurality of communication devices. The communication devices are attached to the cellular network via a radio link. The node further comprises at least one processor configured to allocate first reoccurring resources on the radio link of the cellular network to a first relaying channel. The first relaying channel is between an access point node of the cellular network and some of the plurality of communication devices that are assigned to a first set. The at least one processor is further configured to allocate second reoccurring resources on the radio link of the cellular network to a second relaying channel. The second relaying channel is between the access point node of the cellular network and some of the plurality of communication devices that are assigned to a second set. The first reoccurring resources are shared between the communication devices assigned to the first set. The second reoccurring resources are shared between the communication devices assigned to the second set.

In some embodiments, the first reoccurring resources may be orthogonal to the second reoccurring resources.

According to an aspect, a method is provided. The method comprises allocating, to a first relaying channel, first reoccurring resources on a radio link of a cellular network. The first relaying channel is between an access point node of the cellular network and some of a plurality of communication devices attached to the cellular network via the radio link. The method further comprises allocating, to a second relaying channel, second reoccurring resources on the radio link of the cellular network. The second relaying channel is between the access point node of the cellular network and some of the plurality of communication devices attached to the cellular network via the radio link. The first reoccurring resources are shared between the communication devices assigned to a first set. The second reoccurring resources are shared between the communication devices assigned to a second set.

In some embodiments, the first reoccurring resources may be orthogonal to the second reoccurring resources.

According to an aspect, a relaying node of a cellular network is provided. The relaying node comprises an interface configured to communicate with a node of a cellular network via a radio link of the cellular network. The interface is further configured to communicate with some of the plurality of communication devices attached to the cellular network via the radio link. The relaying node comprises at least one processor configured to receive, via the interface from the node, a scheduling message. The scheduling message indicates reoccurring resources allocated to a relaying channel of the radio link. The relaying channel is between an access point node of the cellular network and some of the plurality of communication devices that are assigned to a set. The reoccurring resources are shared between the communication devices assigned to the set. The at least one processor is configured to establish the relaying channel. The at least one processor is further configured to relay communication between the access point node of the cellular network and the communication devices assigned to the set on the relaying channel.

E.g., the reoccurring resources may be dedicated to the relying channel of the radio link in some embodiments.

According to an aspect, a method is provided. The method comprises receiving, from a node of a cellular network, a scheduling message. The scheduling message indicates reoccurring resources allocated to a relaying channel of the radio link. The relaying channel is between an access point node of the cellular network and some of a plurality of communication devices attached to the cellular network via a radio link. At least some of the plurality of communication devices are assigned to a set. The reoccurring resources are shared between the communication devices assigned to the set. The method further comprises establishing the relaying channel. The method further comprises relaying, on the relaying channel, communication between the access point node of the cellular network and the communication devices assigned to the set.

E.g., the reoccurring resources may be dedicated to the relying channel of the radio link in some embodiments.

According to an aspect, a computer program product is provided. The computer program product comprises control instructions which, when executed by at least one processor, cause the at least one processor to execute a method comprising: allocating, to a first relaying channel, first reoccurring resources on a radio link of a cellular network. The first relaying channel is between an access point node of the cellular network and some of a plurality of communication devices attached to the cellular network via the radio link. The method further comprises allocating, to a second relaying channel, second reoccurring resources on the radio link of the cellular network. The second relaying channel is between the access point node of the cellular network and some of the plurality of communication devices attached to the cellular network via the radio link. The first reoccurring resources are shared between the communication devices assigned to a first set. The second reoccurring resources are shared between the communication devices assigned to a second set.

In some embodiments, the first reoccurring resources may be orthogonal to the second reoccurring resources.

According to an aspect, a computer program product is provided. The computer program product comprises control instructions which, when executed by at least one processer, cause the at least one processor to execute a method comprising: receiving, from a node of a cellular network, a scheduling message. The scheduling message indicates reoccurring resources allocated to a relaying channel of the radio link. The relaying channel is between an access point node of the cellular network and some of a plurality of communication devices attached to the cellular network via a radio link. At least some of the plurality of communication devices are assigned to a set. The reoccurring resources are shared between the communication devices assigned to the set. The method further comprises establishing the relaying channel.

The method further comprises relaying, on the relaying channel, communication between the access point node of the cellular network and the communication devices assigned to the set.

E.g., the reoccurring resources may be dedicated to the relying channel of the radio link in some embodiments.

According to an aspect, a communication device configured to connect to a cellular network is provided. The communication device comprises an interface configured to communicate with an access point node via a direct channel of a radio link of the cellular network and further configured to communicate with the access point node via a relaying channel of the radio link. The communication device further comprises at least one processor configured to receive, via the interface, a scheduling message, the scheduling message indicating reoccurring resources allocated to the relaying channel, the reoccurring resources being shared between the communication device and further communication devices assigned to a set. The at least one processor is configured to communicate with the access point node on the relaying channel in response to receiving the scheduling message.

In some embodiments, the communication device may be configured to negotiate, with the access point node via the relaying channel, a capability of the communication device to communicate on the relaying channel.

The communication device may communicate with the access point node on the relaying channel employing the reoccurring resources.

In some embodiments, the communication device may be configured to execute a collision mitigation technique when communicating with the access point node on the relaying channel.

E.g., the reoccurring resources may be dedicated to the relaying channel of the radio link in some embodiments.

In some embodiments, the communication device may be configured to select between communication with the access point node via the direct channel and the relaying channel depending on elements selected from the group comprising: a Machine Type Communication Functionality of the communication device; a traffic pattern of the communication device; a feature capability of the communication device; a quality-of-service requirement of the communication device; a category of the communication device; a location of the communication device within the cellular network; a channel quality the direct channel; a coverage requirement of the communication device; a channel quality of the relaying channel.

In some embodiments, the communication device may be configured to communicate with the access point node on the direct channel in an idle mode in response to receiving the scheduling message.

In some embodiments, the communication device may be configured to send, via the interface, a connection message, the connection message including an indicator indicating the communication device, and prompting the access point node to communicate with the communication device on the relaying channel. It may be possible that said sending of the connection message is in response to said selecting between the communication via the direct channel and the relaying channel. It may be possible that the scheduling message is received after or in response to said sending of the connection message. It may be possible that the connection message indicates a quality of a frontend of the relaying channel.

The connection message may, in some embodiments, further include elements selected from the group comprising: a Machine Type Communication Functionality of the communication device; a traffic pattern of the communication device; a feature capability of the communication device; a quality-of-service requirement of the communication device; a category of the communication device; a location of the communication device within the cellular network; a channel quality the direct channel; a coverage requirement of the communication device; a channel quality of the relaying channel; the channel quality of the frontend of the relaying channel.

In some embodiments, the communication device may be configured to monitor a channel quality of the frontend of the relaying channel in response to receiving the scheduling message. The communication device may be configured to report the channel quality of the frontend of the relaying channel via the interface to the access point node.

According to an aspect, a method is provided. The method comprises a communication device receiving a scheduling message, the scheduling message indicating reoccurring resources allocated to a relaying channel, the reoccurring resources being shared between the communication device and further communication devices assigned to a set. The method further comprises communicating with the access point node on the relaying channel in response to receiving the scheduling message.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
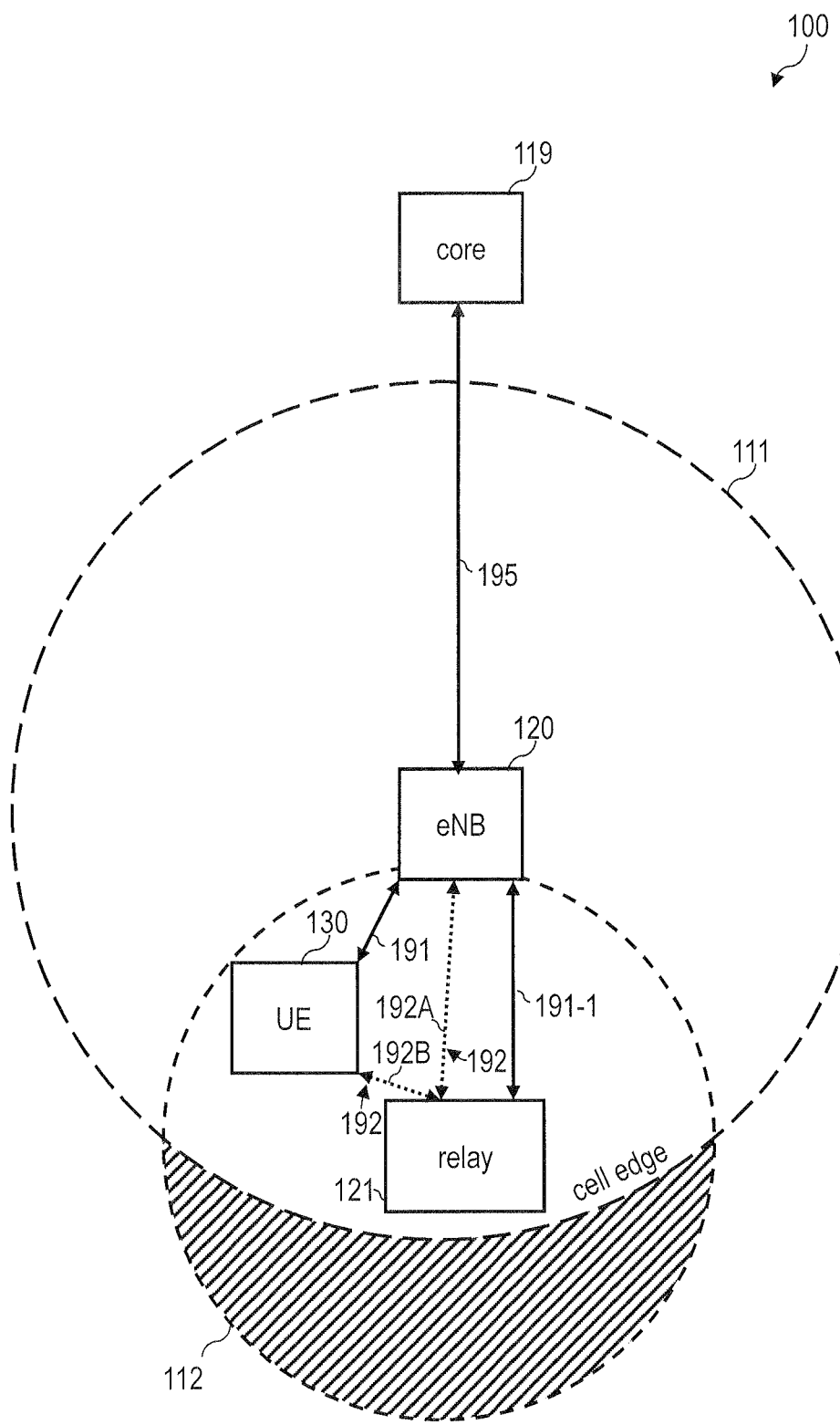
FIG. 1 schematically illustrates a cellular network where communication between a UE and an access point node of the cellular network is possible via a direct channel and a relaying channel.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are explained of providing shared resources to UEs connected to a cellular network. In particular, different shared resources are provided for different groups or sets of UEs. This mitigates collision and interference between the different UEs. By sharing the resources, the spectrum may be effectively utilized which allows to connect a larger number of UEs to the cellular network.

The grouping of the UEs (assignment of UEs to different sets) can be done based on various decision criteria that allow optimizing reusing of the shared resources between the different UEs. In particular, it is possible to do the grouping in a manner that reduces a likelihood of collisions occurring on the shared resources of a given set. For this, one or more properties of the UEs can be taken into account, such as their categories, features, capabilities, traffic pattern, etc. E.g., UEs of different or same capabilities can be assigned to a given set. E.g., UEs having complementary traffic patterns or the same traffic patterns or different traffic patterns can be assigned to a given set. Of course, variations of such decision criteria are possible.

In various scenarios, different sets of UEs are associated with different relaying channels. For a given UE, it becomes possible to flexibly select between a relaying channel and a direct channel for communication on a radio link of a cellular network. This allows determining whether communication would benefit from either the direct channel or the relaying channel; then, it is possible to select between said direct channel and said relaying channel depending on said determining whether the communication would benefit. E.g., by employing the relaying channel for communication, it may be possible to reduce an energy consumption of a given UE, because a lower transmission power may be sufficient to achieve a decent transmission quality. The battery life of a battery-powered UE may be prolonged—which may be particularly desirable for MTC-applications.

While, generally, such techniques as explained herein can be applied to uplink (UL) transmission and downlink (DL) transmission, such techniques might find particular application in UL transmission to reduce the required transmit power of the UEs.

Turning to FIG. 1, a scenario is shown where a UE 130 is attached to a cellular network 100. The radio link of the cellular network 100 is established between an access point node 120 of the cellular network 100 and the UE 130. The radio link may comprise one or more frequency bands, e.g., in the licensed or unlicensed spectrum. The access point node 120 is connected with a node 119 of the core of the cellular network 100. The access point node 120 and the UE 130 wirelessly transceive on the radio link of the cellular network 100 in order to communicate; communication between, e.g., the UE 130 and the node 119 of the core of the cellular network 100 is implemented via the access point node 120.

The radio link offers a direct channel 191 and a relaying channel 192 (illustrated in FIG. 1 by the dotted line) established via a relay 121 for communication between the UE 130 and the access point node 120. The radio link further offers a direct channel 191-1 for communication between the access point node 120 and the relay 121. For higher-layer data related to the UE 130, the direct channel 191 and/or the relaying channel 192 may be employed. For higher-layer data related to the relay 121 itself, the direct channel 191-1 may be employed. The various channels 191, 191-2, 192 may provide UL and/or DL communication.

The relaying channel 192 comprises a frontend communication section 192B in-between the UE 130 and the relay 121; the relaying channel 192 also comprises a backhaul communication section 192A in-between the relay 121 and the eNB 120. The relay 121 forwards data received on the first (second) communication section of the relaying channel 192 along the frontend 192B. The relay 121 can be a layer 1, layer 2, or layer 3 relay.

The backhaul communication section 192A may be reused by multiple UEs connected to the access point node 120 via the relay 121. In this respect, the relay 121 may be configured to aggregate traffic for multiple UEs employing its relaying channel 192. The relay 121 can be configured to act as a buffer between the UEs employing its relaying channel 192 and the access point node 120. The relay 121 can be configured to buffer data communicated between the access point node 120 and the UEs connected via the relaying channel 192 to the network 100. E.g., data may be aggregated or concatenated to better use available resources on the backhaul communication section 192A of the relaying channel 192.

Generally, the same or different resources on the radio link may be employed for the frontend section 192B and the backhaul section 192A. E.g., it is possible that transmission by the access point node 120 is muted during transmission by the relay 121 on the frontend section 192B such that the relay 121 can communicate in the frequency band also employed by the access point node 120. Muted transmission may be achieved by sending logical "zeros" or padding.

In FIG. 1, the relay 121 is deployed close to an edge of a cell 111 of the cellular network 100 associated with the access point node 120. In FIG. 1, a sub-cell 112 associated with the relay 121 illustrated in the sub-cell 112 transceiving of signals to and from the relay 121 via the radio link is possible. Thus, the sub-cell 112 of the relay 121 effectively enhances the coverage area of the cellular network 100 (shown in FIG. 1 by the diagonally dashed area).

Considering a scenario where the UE 130 is located in the diagonally dashed area, only the relaying channel 192 is available to transmit data via the radio link; this is because the UE 130 is effectively located outside the range of the access point node 120 and it is not possible to transceive signals to and from the relay 121. Here, the direct channel 191 would not be available.

More specifically, the direct channel 191 and/or the relaying channel 192 being available to transmit data may refer to at least one of the following: a signal level of the corresponding channel 191, 192 being above a threshold; the data transmission via the respective channel 191, 192 fulfilling quality of service (QOS) requirements of the data; a mobility of the UE 130 indicating that the data transmission via the respective channel 191, 192 will be available within the near future. In other words, the data transmission via the respective channel 191, 192 being available can correspond to a scenario where stable and lasting transmission via the respective channel 191, 192 is expected to be possible. Such a scenario in particular does not correspond to the reference implementation where the coverage area, as explained above is extended, i.e., the cell-edge scenario.

As illustrated in FIG. 1, the UE 130 is not located in the enhanced coverage area (shown in FIG. 1 by the diagonally dashed area). Rather the UE 130 is located in-between the access point node 120 and the relay 121. Because of this, both, the direct channel 191 and the relaying channel 192 are available to send and/or receive data (communicate). Thus, it is possible to select between the direct channel 191 and the relaying channel 192 for communication. Hereinafter, various techniques are described that are applicable to a scenario where the UE 130 is free to select between the direct channel 191 and the relaying channel 192. Hereinafter, techniques are described with respect to said selecting. In particular, hereinafter, various decisions criterions to be taken into account in said selecting are described.

Besides selecting between the direct channel 191 and the relaying channel 192, it is also possible to select between multiple relaying channels that employ different relays (not shown in FIG. 1).

A specific decision criterion that can be taken into account when selecting between different channels 191, 192 for communicating with the access point node 120 is whether the UE 130 is assigned to a set of UEs that relies on shared reoccurring resources on the radio link.

By implementing said selecting between the direct channel 191 and the relaying channel 192, new functionality can be provided. Here, one of the two channels 191, 192 can be prioritized over the other. This allows to flexibly select the appropriate channel 191, 192 in a scenario where said selecting allows to achieve benefits of different kinds. E.g., it could be possible to reduce power consumption, optimize resource allocation, reduce interference into channels of other communication devices, etc. by said flexibly selecting.

Generally, the UE 130 may be a device of different type or kind. E.g., it is possible that the UE 130 is a mobile device of a group comprising a mobile phone, a smartphone, a personal digital assistant, a mobile music player, a smartwatch, a wearable electronic equipment, a camera, an event data recorder, a sensor, an actuator, and a mobile computer. Generally, such techniques as mentioned above may find particular application in Machine Type Communication networks where sensors and actuators are attached to the cellular network 100.

Generally, it is possible that the relay 121 is an entity of the cellular network 100 which is purposely deployed at a given location. However, in various scenarios, it is also possible that the relaying channel 192 is a device-to-device (D2D) relaying channel. Here, it is possible that the relay 121 is a further UE which implements the relaying functionality. The access point node 120 may then communicate with the relay 121 on a corresponding direct channel 191-1. In particular in such a scenario of the D2D relaying channel 192, it is possible that, over the course of time, the position of the relay 121 changes. Then, it may become necessary to execute said selecting of the appropriate channel 191, 192 on the radio link anew from time to time; this is because the properties influencing a decision criterion taken into account when said selecting is executed may vary depending on the particular location of the relay 121. Hence, generally it is possible that said selecting of the channel 191, 192 for communicating with the access point node 120 is in response to detecting a presence of the relay 121 (discovery of the relay) and/or an availability of the relaying channel 192.

In a scenario where the relay 121 is a further UE which implements the relaying functionality, it is possible that the further UE is reconfigurable so that it selectively provides the relaying functionality depending on a mode of operation. A user may switch on/switch off the relaying functionality. The relaying functionality may also be selectively triggered depending on various trigger parameters such as, e.g., battery charge, sensor information, etc.

Generally, such techniques as mentioned above and as explained hereinafter in further detail, may be readily applied to different kinds of communication networks 100. Hereinafter, a particular focus will be put on the radio access technology according to the Third Generation Partnership (3GPP) Long Term Evolution (LTE) protocol for illustrative purposes only. This is why in FIG. 1 the access point node 120 is labeled evolved Node B (eNB).

Figure 2:
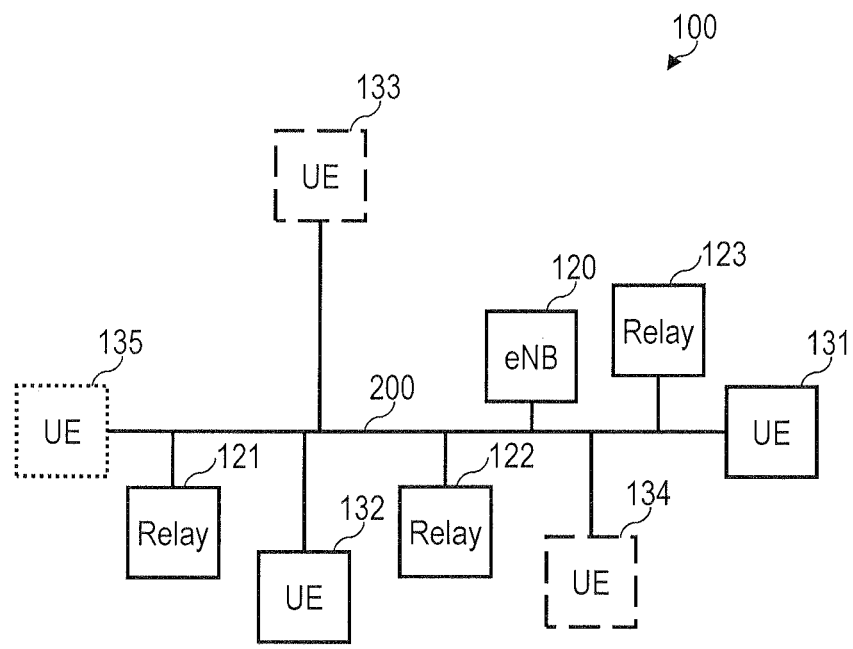
FIG. 2 schematically illustrates communication between an access point node and a plurality of UEs via a radio link, wherein the plurality of UEs are assigned to different sets, the different sets being associated with orthogonal resources on the radio link and employing different relaying channels.
Figure 2:
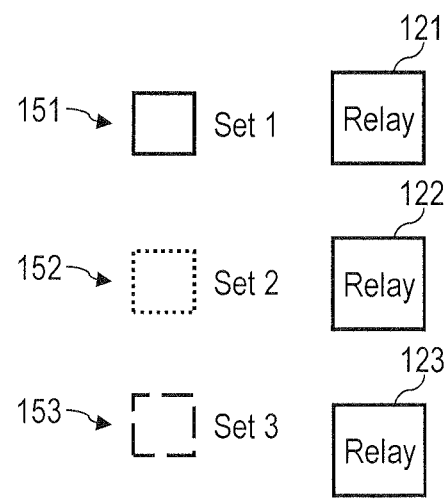

FIG. 2 illustrates aspect with respect to assignment of different UEs 131-135 to different sets 151-153. As can be seen from FIG. 1, five UEs 131-135 are attached to the cellular network 100 via the radio link 200. Generally, the cellular network 100 supports, both, unicast transmission between the eNB 120 and any of the UEs 131-135, as well as broadcast transmission 110 between any one of the eNB 120 and the UEs 131-135, and all or subsets of the other network devices 131-135, 120.

In the scenario of FIG. 2, the various UEs 131-135 are assigned to different sets 151-153. Each set is associated with a different relay 121-123; i.e., communication between the UEs 131-135 assigned to different sets 151-153 and the access point node 120 employs different relaying channels 192 (not shown in FIG. 3).

Figure 3:
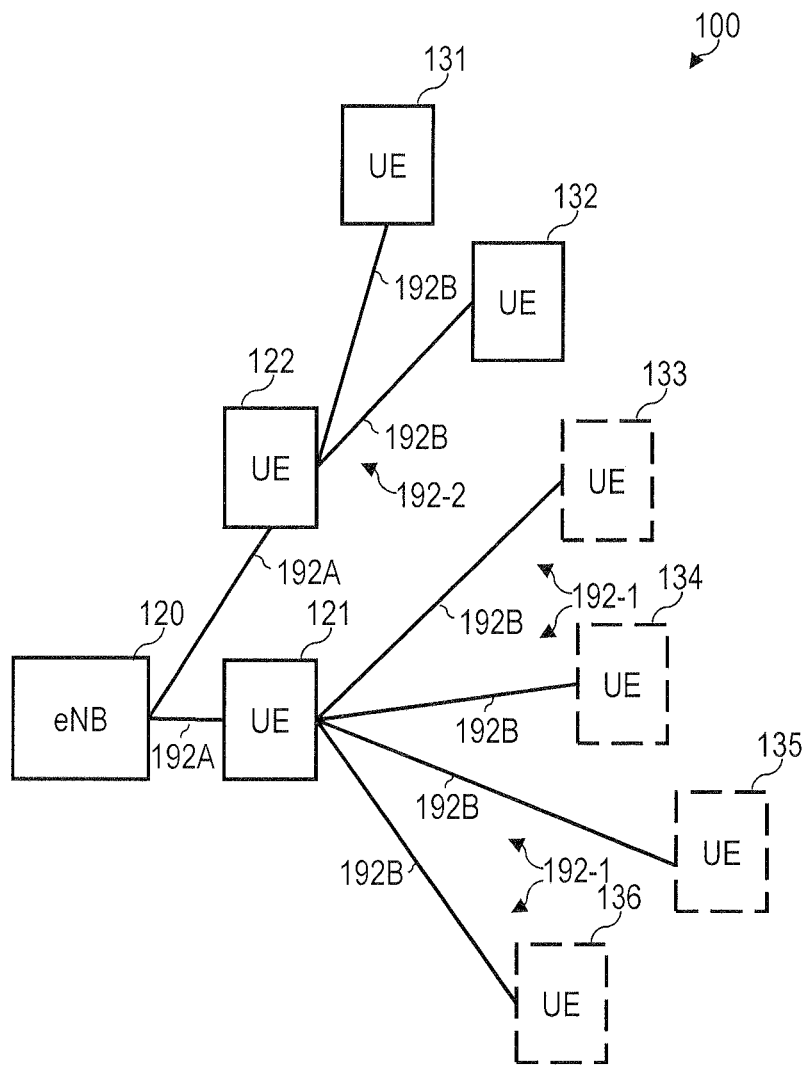
FIG. 3 schematically illustrates different relaying channels between the different sets of UEs and the access point node.

This is illustrated in FIG. 3 where UEs 131, 132 communicate with the access point node 120 via the relaying channel 192-2 and the relay 122; while the UEs 133-136 communicate with the access point node 120 via the relaying channel 192-1 and the relay 121.

Hereinafter, techniques are illustrated which enable to reduce interference in between the various relaying channels 192-1, 192-2 in an efficient way. This is achieved by assigning the various UEs 131-136 communicating via different relaying channels 192-1, 192-2 to different sets 151-153. For each set 151-153, dedicated and thus distinct reoccurring resources 261-263 are provided on the radio link 200 of the cellular network 100 (cf. FIG. 4A). For example, the different reoccurring resources 261-263 of the different sets 151-153 can be orthogonal to each other. Orthogonal resources may correspond to at least one of the following: resources residing on different carrier frequencies; and/or resources residing on the same carrier frequency, but being frequency divided; and/or resources being time divided; and/or resources being differently coded to be distinguishable by corresponding decoding. In the example scenario of FIG. 4A the orthogonal resources 261-263 are provided on the same carrier frequency, but are time and frequency divided as they use different time-frequency resource allocation 210. By providing the resources 261-263 orthogonal to each other, interference between the various relaying channels 192-1, 192-2 is mitigated. The time-frequency resource allocations 210 can, e.g., correspond to resource blocks or resource elements according to the 3GPP LTE protocol.

A further effect that may be achieved by the techniques described herein is to mitigate cell load, i.e., traffic load imposed on the access point node 120. This can be achieved by distributing the UEs 131-136 to connect to the access point node 120 via various relaying channels 192, 192-1, 192-2. The respective relays 121-123 may aggregate data and/or buffer data in order to reduce the number of messages communicated to the access point node 120. Alternatively or additionally, the respective relays 121-123 may process data in order to relief the access point node 120 from at least some processing 120 tasks.

In particular, the reoccurring resources 261-263 are prospectively allocated by the eNB 130 to the different UEs 131-136 assigned to the different sets 151-153. This means that for a certain future time period the resources 261-263 are persistent; e.g., the reoccurring resources 261-263 may be semi-persistent in that they have a limited lifetime and expire by the end of the limited lifetime.

If a give one of the UEs 131-136 needs to transmit data after the reoccurring resources 261-263 have been allocated, the given UE 131-136 can readily transmit the data on the available resources and, in particular, does not need to send a dedicated scheduling request and wait for receiving a dedicated scheduling grant first.

A typical scenario in MTC networks is that each UE 131-136 only has a comparably small amount of data to transmit, e.g., in the order of 0.5 MB or less. Thus, the shared reoccurring resources are not blocked long for transmission of each individual UE 131-136. Thus, bandwidth usage can benefit from schemes of providing shared resources.

Figure 4A:
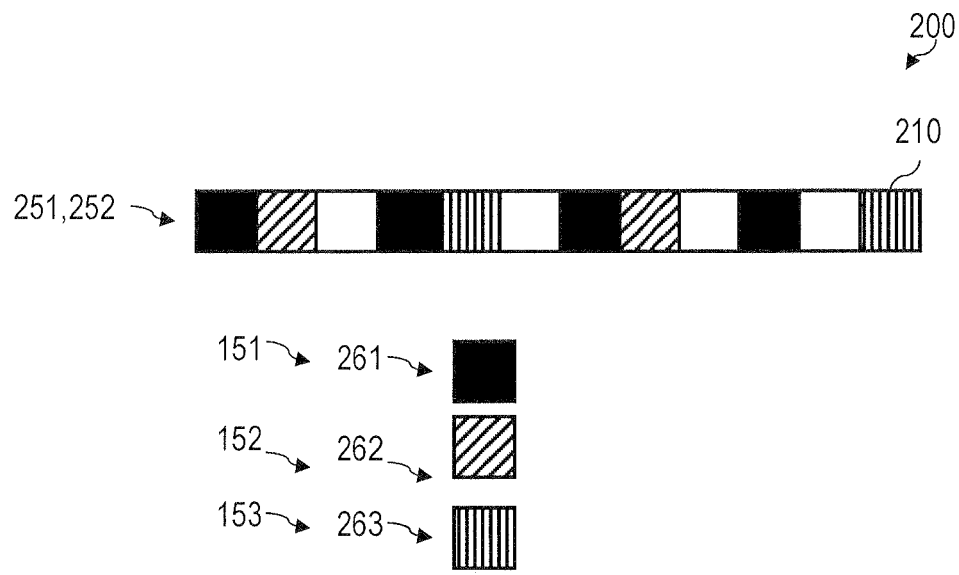
FIG. 4A schematically illustrates logical resources allocated on the radio link of the cellular network to different relaying channels.

Generally, reoccurring resources 261-263 can be allocated on a data channel 251 of the radio link 200 and/or can be allocated on a control channel 252 of the radio link 200. In the scenario of FIG. 4A—which is a logical view of the resource allocations—the reoccurring resources 261-263 are allocated on a control channel 252. E.g., it is possible that the control channel 252 is a random access control channel 252 that is reserved for attach messages of UEs 131-136 that are connecting to the cellular network 100, i.e., for connection setup.

Generally, it is possible that the reoccurring resources 261-263 associated with different sets 151-153 comprise a larger or smaller number of time-frequency resource allocations 210, are scheduled more often/less frequently, and/or in different frequency bands, etc. The reoccurring resources 261-263 can be generally scheduled with a fixed periodicity or having variable time intervals in-between.

Figure 4B:
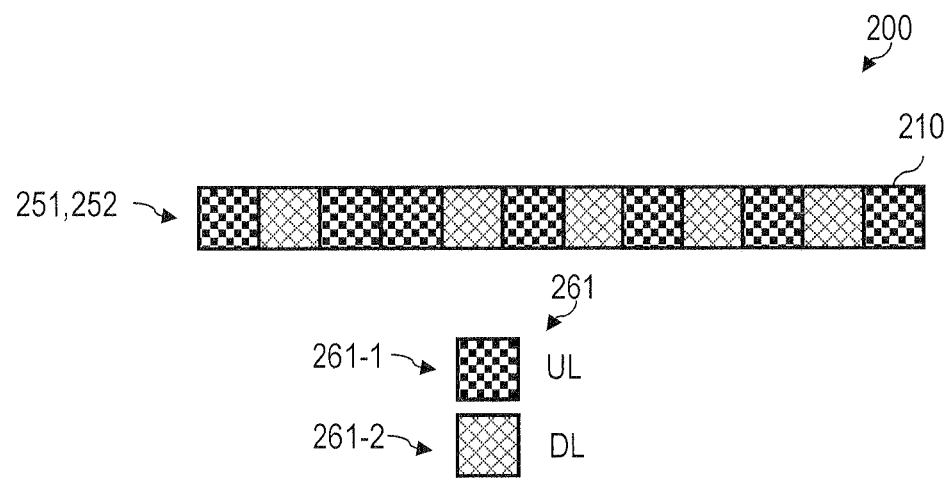
FIG. 4B schematically illustrates logical resources allocated on the radio link of the cellular network to uplink and downlink communication of a given relaying channel.

For each set 151-153, according to various scenarios, the reoccurring resources 261-263 can be broken down in UL reoccurring resources 261-1 and DL reoccurring resources 261-2, cf. FIG. 4B. E.g., to avoid interference, it is possible that during the downlink reoccurring resources 261-2, transmission by the access point node 120 is essentially muted; e.g., this can be implemented by transmitting "none" information, e.g., by utilizing almost blank subframes (ABS) according to the 3GPP LTE protocol and/or padding. It is also possible that during the uplink reoccurring resources 261-1, the relay 121 is not transmitting any information to the access point 130.

Figure 5:
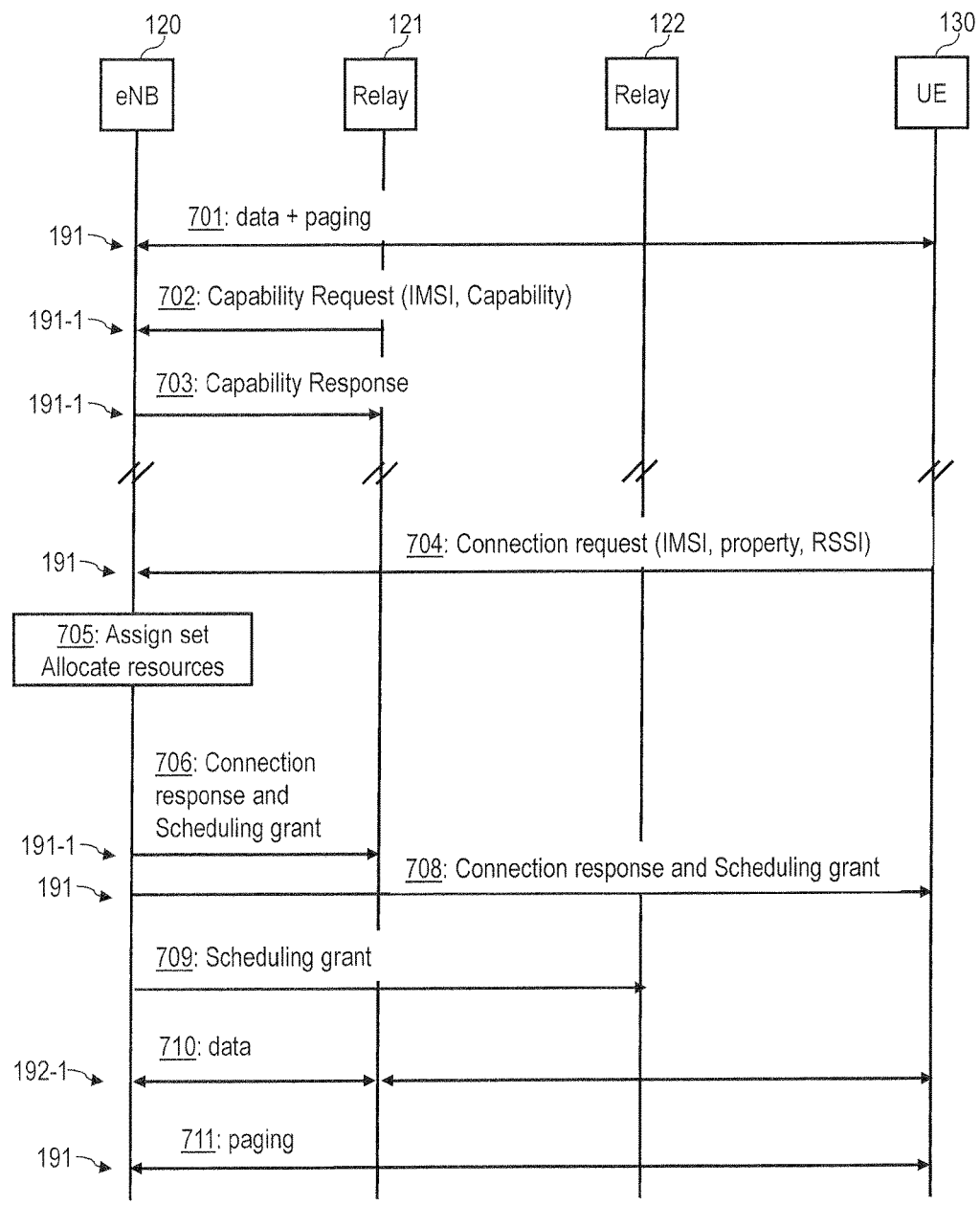
FIG. 5 is a signaling diagram illustrating signaling according to various embodiments.

FIG. 5 is a signaling diagram illustrating aspects of signaling in between various entities 120, 121, 122, 130 of the cellular network 100, wherein the signaling provides scheduling of shared resources to various relaying channels 192.

First, communication of higher-layer data and control signaling such as paging is executed on a direct channel 191 between the UE 130 and the access point node 120. The UE 130 is already attached to the cellular network 100.

Next, a capability request 702 is sent from the relay 121 to the access point node 120 via the direct channel 191-1 between the relay 121 and the access point node 120.

E.g., the capability request 702 may be sent upon network registration, i.e., during an Attach procedure during which the relay 121 attaches to the cellular network 100. In other scenarios, it would be possible that relay functionality may be selectively enabled by a user of a UE implementing the relay functionality of the relay 121; in such a scenario, it would be possible that the capability request 702 is sent in response to the user activating the relay functionality.

In the scenario FIG. 5, the capability request 702 is sent employing a unicast transmission on an uplink control channel section of the direct channel 191-1; likewise, the capability response 703 is sent employing a unicast transmission on a DL control channel section of the direct channel 191-1.

Generally, it is possible to employ the direct channel 191-1 in between the relay 121 and the access point node 124 for control signaling related to establishing the relaying channel 192-1 between the UE 130 and the access point node 120 via the relay 121. Additionally, it is possible to employ the direct channel 191-1 in between the relay 121 and the access point node 120 for communication of higher-layer data of the relay 121 itself; in particular, in the scenario where the relay functionality of the relay 121 is implemented by a UE having D2D functionality, higher-layer data originating at the UE 121 itself may be transmitted on a data channel section of the direct channel 191-1.

The capability request may include an indicator indicating the relay 121, e.g., the international mobile subscriber identification (IMSI). Further, the capability request 702—implicitly or explicitly—indicates the capability of the relay 121 to establish the relaying channel 192-1. In particular, the relay 121 itself may be as UE which has the additional functionality of establishing the relaying channel 192-1 via the D2D communication. Further, as part of the capability request 702, security credentials may be provided to the access point node 120 such that the access point node 120 may judge whether communication via the relaying channel 192-1 and the relay 121 would potentially cause a security risk. Such and further consideration can be taken into account by the access point node 120 when authorizing the relay 121 to establish the relaying channel 192-1 by means of a capability response 703.

In the scenario illustrated in FIG. 5, a further relay 122 is present; a capability negotiation corresponding to the capability request 702 and the capability response 703 may be executed in between the further relay 122 and the access point node 120 (not shown in FIG. 5).

In some scenarios, a capability negotiation comparable to 702, 703 may be executed between the access point node 120 and the UE 130 (not shown in FIG. 5). In this respect, the UE 130 may be configured to negotiate with the access point node 120 its capability of communicate on a relaying channel 191-1, 191-2. This capability negotiation may allow to identify that the UE 130 has the capability of communicating via a relaying channel 191-1, 191-2. Technical capabilities and specifications of the UE 130 and/or security aspects may be considered in said capability negotiation. The capability negotiation may employ a control channel section of the direct channel 191. E.g., the capability negotiation may be part of an Attach procedure of the UE 130 to the network 100. In other scenarios, it may not be necessary to implement such a capability negotiation between the UE 130 and the access point node 120.

E.g., scenarios are conceivable where the relays 121, 122 mimic the access point node 121 behavior such that the UE 130 is not aware that it is communicating via a relaying channel. Then, legacy functionality of the UE 130 may be used for communicating via the relaying channel 191-1, 191-2.

At some later point in time, the UE 130 detects presence of the relay 121 and the further relay 122. E.g., the relay 121 and the further relay 122 could be configured to broadcast a configuration message indicating the capability of the respective relay 121, 122 to establish the relaying channel (not shown in FIG. 5).

The UE 130, via the direct channel 191, sends a connection request 704 to the access point node 120. The connection request 704 prompts the access point node 120 to grant communication via at least one of the relaying channels 191-1 of the relays 121, 122. In response to receiving the connection request 704, the access point 120 assigns the given UE 130 to either the first set 151 or the second set 152, or maintains the communication implemented via the direct channel 191.

E.g., in some scenarios, the connection request 704 may be sent in response to the UE 130 selecting communication via at least one of the relaying channels 191-1 over communication via the direct channel 191. This may be in response to a channel quality of the frontend 192B being favorable in terms of required transmission power and/or error rates, etc.

While in the scenario of FIG. 5, the connection request 704 is sent via the direct channel 191, in other scenarios it would be possible that a one or more connection requests are sent via the relays 121, 122. E.g., in various scenarios it might be possible that at least some of the relays 121, 122 identify the UE 130 that intends to transmit data. The respective UE(s) 121, 122 may then indicate this information to the access point node 120.

Further, while in the scenario of FIG. 5, a situation is shown where communication between the UE 130 and the access point node 120 via the direct channel 191 is already ongoing, i.e., a respective bearer for communication between the access point node 120 and the UE 130 has been previously established, —see 701—in other situations the connection request 704 may be sent as part of an Attach procedure of the UE 130 to the cellular network 100. Here, it may be possible that the communication request 704 is sent via a legacy random-access channel.

The connection request 704 include an indicator indicating the UE 130, e.g., the IMSI. Further, the connection request 704 indicates channel quality of the frontend 192B of the respective relaying channel 192-1, 192-2, e.g., in terms of the received signal strength indicator (RSSI) measured by the UE 130. Channel sensing techniques may be employed. Further, the connection request 704 indicates a property of the UE 130; e.g., the property may be at least one of the following: a MTC functionality of the UE 130; a traffic pattern of the UE 130; a feature capability of the UE 130; a QoS requirement of the UE 130; a category of the UE 130; a location of the UE 130 in the cellular network 100; a channel quality of the direct channel 191 between the UE 130 and the access point node 120; and a coverage requirement of the UE 130. All such properties may be taken into account when assigning the UE 130 to a given set 151-153 at 705 and/or when allocating the reoccurring resources 261-263 to the various sets 151-153.

For example, the coverage requirement of the UE 130 can correspond to whether the respective UE 130 is associated with normal coverage or different levels of enhanced coverage. Enhanced coverage may require an increased transmission power when communicating with the respective UE 130.

The channel quality can correspond to radio-related parameters such as the RSSI or quality information of the radio link 200. E.g., a channel quality indicator can be taken into account.

The location within the cellular network 100 as mentioned above can be specified e.g. on cell-level or sub-cell level. Thereby, it becomes possible to assign those UEs 130-136 to the same set 151-153 that are within the same location area.

A category of the UE 130 can correspond to device description types or features of the UE 130-136. E.g., the UE 130-136 can be one of a mobile phone, a smartphone, a tablet, a personal digital assistant, a mobile music player, a smart watch, a wearable electronic equipment, a smart meter, a sensor, an actuator, and a mobile computer. In particular, the UE 130 may be classified as having Machine Type Communication functionality. Depending on the corresponding type of the UE 130-136, it is possible to assign a given UE 130-136 to a particular set 151-153. E.g., all sensors may be assigned to a first set 151; while all actuators are assigned to a second set 152.

Different types of UEs 130-136 can provide different types of data. The different types of data can correspond different services such as Voice-over-IP, best effort data, high-priority data, etc. Depending on the type of data, different QoS requirements typically need to be fulfilled when transmitting the data. These QoS requirements associated with the type of data of a given UE 130-136 can be taken into account when assigning the UE 130 to a given set 151-153.

A feature capability of the UE 130 can correspond to certain limitations and possibilities in types and classes of data to be transmitted. E.g., if certain UE 130 cannot transmit in a given frequency band, or if certain UE 130 only allow to transmit small data, such limitations of the capability should be taken into account when assigning the UE 130 to a given sets 151-153.

The traffic pattern of the UE 130 can correspond to a periodicity or frequency of occurrence with which data to be transmitted is expected to occur, a size of individual data blocks to be transmitted, an overall size of data, peak times for data to be transmitted, etc. E.g., while some UE 130 may require a constant stream of small chunks of data, other UE 130 could require only seldom transmission of large chunks of data. E.g., while a first UE 130-136 needs to transmit data at a comparably low, but constant data rate of, e.g., 20 kilobit per second, a second UE 130-136 might require sending of a status report having a large file size of 50 MB, e.g., once per day at 12 pm. Such traffic patterns can be taken into account when assigning the UE 130 to a given sets 151-153.

All such properties as mentioned above may be taken into account when assigning the UE 130 to a given set 151-153. In various scenarios, the channel quality of the frontend 192B of the respective relaying channel 192-1, 192-2 may be a property of particular interest when assigning the UE 130 to a given set 151-153. In particular, in order to provide better transmission properties for communication between the UE 130 and the access point node 120, it may be required to pay particular attention to beneficial properties in terms of channel quality of the frontend 192B.

Above, it has been explained that when assigning the UE 130 to a given set 151-153 various properties can be taken into account. Generally, it is possible to take into account these properties when allocating the corresponding reoccurring resources 261-263 of the various sets 151-153 at 705. E.g., depending on the traffic pattern, a larger/smaller number of time-frequency resource allocations 210 could be allocated by the respective reoccurring resources. Likewise, depending on the capability and/or category of the UEs 130-136 assigned to a given set 151-153, a different number of resource allocations 210 could be allocated by the respective reoccurring resources 261-263. E.g., if the QoS requirements indicates that a small latency is needed for transmission of data, time-frequency resource allocations 210 can be scheduled at a comparably high density on the radio link 200; by this, it is ensured that, after data arrives in a transmit buffer of the UE 121-125, the time until the next allocated time-frequency allocation 210 is comparably small. Thus, generally, by appropriately allocating the reoccurring resources 261-263 on the radio link 200, it is possible to grant prioritization of certain sets 151-153 over other sets 151-153.

In the scenario of FIG. 5, at 705, the UE 130 is assigned to the set 151 associated with the relaying channel 192-1 via the relay 121. Because of this, the access point node 120 sends a scheduling grant 706 to the relay 121, the scheduling grant 706 indicating the reoccurring resources 261 associated with the set 151 and allocated by the access point node 120 at 705. In the scenario of FIG. 5, the scheduling grant 706 is sent employing a unicast transmission on a DL control channel section of the direct channel 191-1.

Further, the access point node 120 sends the scheduling grant 708 via the direct channel 191 to the UE 130; this is to inform the UE 130 that it should employ the relaying channel 192-1 via the relay 121 to communicate with the access point node 120 and to rely on the allocated reoccurring resources indicated by the scheduling grant 708. In other implementations it would be possible that the scheduling grant 708 is sent by the relay 121 upon receiving the scheduling grant 706.

The access point node 120 sends a scheduling grant 709 to the relay 122, the scheduling grant 709 indicating the reoccurring resources 262 associated with the set 152 and allocated by the access point node 120 at 705. In the scenario of FIG. 5, the scheduling grant 709 is sent employing a unicast transmission on a DL control channel section of the direct channel between the access point node 120 and the relay 122. The reoccurring resources 262 can be employed by further UEs (not shown in FIG. 5) that are assigned to the set 152 to communicate with the access point node 120 via the relaying channel 191-2 of the relay 122.

Communication between the UE 130 and the access point node 120 is then executed via the relaying channel 192-1, 710. In the scenario of FIG. 5, the relaying channel 192-1 provides bidirectional communication, i.e., UL and DL functionality. In other scenarios, it would be possible that the relaying channel 192-1 provides only uni-directional communication, i.e., either UL or DL functionality. E.g., where the relaying channel 192-1 provides uni-directional communication in the form of UL functionality (DL functionality) it would be possible that the DL functionality (UL functionality) is maintained on the direct channel 191 between the UE 130 and the access point node 120. It should be understood in this context that the effect of reducing power consumption by the UE 130 may be achieved even if the relaying channel 191-1 only provides uni-directional communication in the form of UL functionality; this is because in such a scenario the transmission power employed by the UE 130 may be reduced to the shorted radio signal path in between the UE 130 and the relay 121 if compared to the radio signal path between the UE 130 and the access point node 120 directly.

However, also in the scenario of FIG. 5 where the relaying channel 192-1 provides bidirectional communication, the direct channel 191 between the UE 130 and the access point node 120 is maintained, 711. However, the direct channel 191 is operated in an idle mode. E.g., in the idle mode, communication on the direct channel 191 may be restricted to sending and/or receiving of control data such as paging of the UE 130 by the access point node 120. Alternatively or additionally, control signaling from the UE 130 to the access point node 120 may be via the direct channel 191 in idle mode.

Paging may refer to the access point node 120 being able to request a UE 130 to initiate a network connection. In idle mode, the UE 130 can keep its receiver and transmitter switched off to save battery, but at a paging event, which typically occurs at predetermined time intervals, the UE 130 turns on the receiver and receives the control data to determine if it is being paged or not. In case there is a paging for the UE 130, the UE 130 attempts to setup a connection with the access point node 120 via the direct channel 191.

Figure 6:
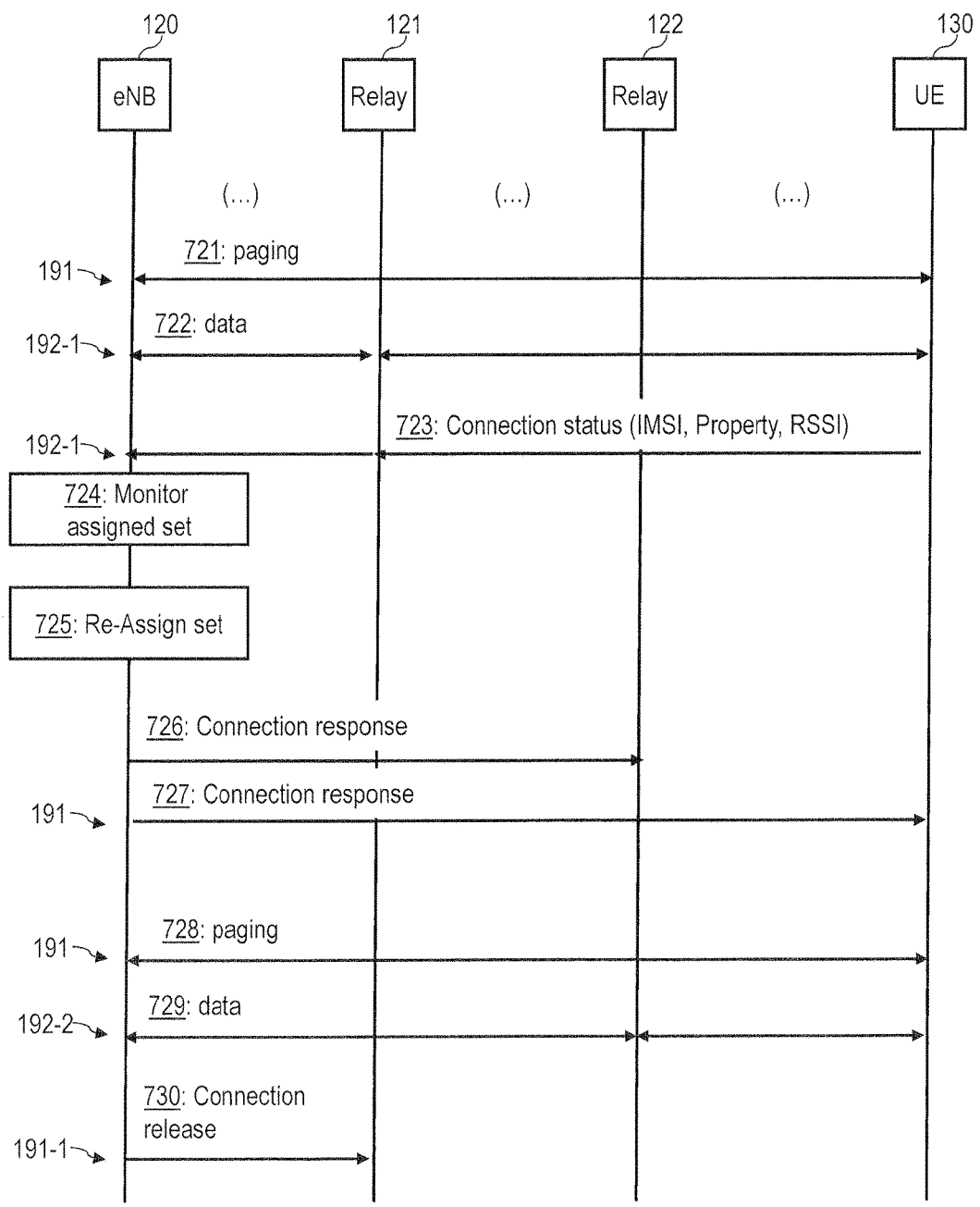
FIG. 6 is a signaling diagram illustrating signaling according to various embodiments.

Now turning to FIG. 6, a scenario is shown where the relaying channel 192-1 has already been established, 722 and is used for communicating between the access point node 120 and the UE 130; the direct channel 191 between the UE 130 and the access point node 120 is operated in the idle mode, 721.

A connection status report 723 is sent by the UE 130 and received by the access point node 120; in the scenario FIG. 6, the connection status report 723 is sent via the relaying channel 192-1; in other scenarios, it would be possible to alternatively or additionally send the connection status report 723 via the direct channel 191.

The connection status report may generally correspond to the connection request 704; it would be possible that the connection status report 723 further comprises an indicator indicating the relaying channel 192-1. In particular, the connection status report 723 includes a current value of the channel quality of the frontend 192B of the relaying channel 192-1.

Based on the connection status report 723, the access point node 120 and/or the UE 130 may monitor the channel quality of the frontend 192B of the relaying channel 192-1. Alternatively or additionally to the channel quality as indicated by the connection status report 723, it would be possible to take into account during monitoring, 724, a channel quality of the relaying channel 192-1 determined by the relay 121 and/or the access point node 120, e.g., by implementing corresponding techniques of channel sensing in one or two of the nodes 120, 121. In some scenarios, the UE 130 may repeatedly report the channel quality of the frontend 192B of the relaying channel 192-1 to the access point node 120, e.g., via the relaying channel 192-1 and/or via the direct channel 191. A control channel section may be employed for said reporting.

In the scenario of FIG. 6, at 724, it is determined that the channel quality of the front end 192B of the relaying channel 192-1 has degraded. Because of this, the UE 130 is reassigned to the set 152 which is associated with the relaying channel 192-2 via the relay 122. In further scenarios, changes in the properties of the UE 130 as illustrated above may also lead to reassignment of the UE 132 another set 151-153; current values of the properties may be included in the status report 723.

Corresponding control signaling 726, 727, 730 informs the relays 121, 122 and the UE 130 of the new assignment of the UE 130 to the set 152. Once the UE 130 has been newly assigned to the set 152, data is communicated via the relaying channel 192-2, 729. The direct channel 191 is maintained between the access point node 120 and the UE 130 and continuously operated in the idle mode, 728.

Figure 7:
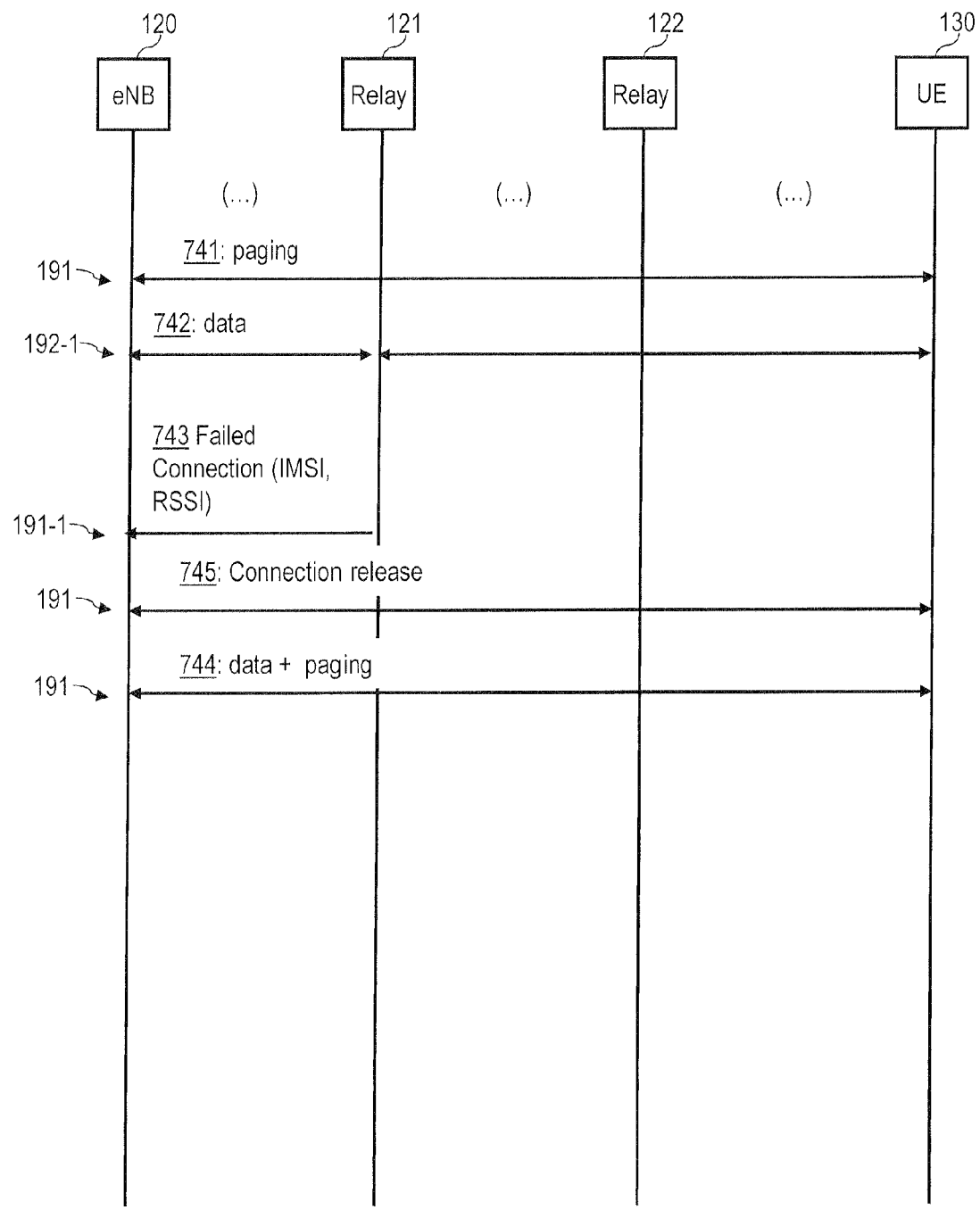
FIG. 7 is a signaling diagram illustrating signaling according to various embodiments.

Turning to FIG. 7, a signaling diagram is shown which illustrates aspects of maintaining the direct channel 191 in the idle mode in between the access point node 120 and the UE 130. 741 and 742 generally correspond to 721 and 722, respectively.

Then, the relay 121 determines that the quality of the front end 192B of the relaying channel 192-1 has severely degraded and the connection between the relay 121 and the UE 130 is lost. Via the direct channel 191-1, the relay 121 sends a respective control message 743 to the access point node 120. The access point node 120 informs the UE 130 by means of a connection release 745 that communication should be moved to the direct channel 191 and that the relaying channel 192-1 should not be employed for any further. Because of this, data and control signaling is then executed on the direct channel 191, 744. As such, the direct channel 191 is selected for communication instead of any relaying channel 192-1, 192-2. As can be seen from the above, by maintaining the direct channel 191 and the idle mode, a fallback to the direct channel 191 can be implemented with low latency. This may be of particular use in scenarios where the relay 121 is itself a mobile device such as a UE which may move around different locations within the cellular network 100.

With respect to FIGS. 5-7, scenarios have been illustrated where the logic for assigning the UEs 130-136 to the various sets 151-153 resides within the access point node 120. Likewise, with respect to FIGS. 5-7, scenarios have been illustrated where the logic for allocating the reoccurring resources shared between the UEs 130-136 assigned to the various sets 151-153 resides within the access point node 120. Generally, it is possible that at least parts of this logic resides within a network node 119 of the core of the cellular network 100.

Figure 8:
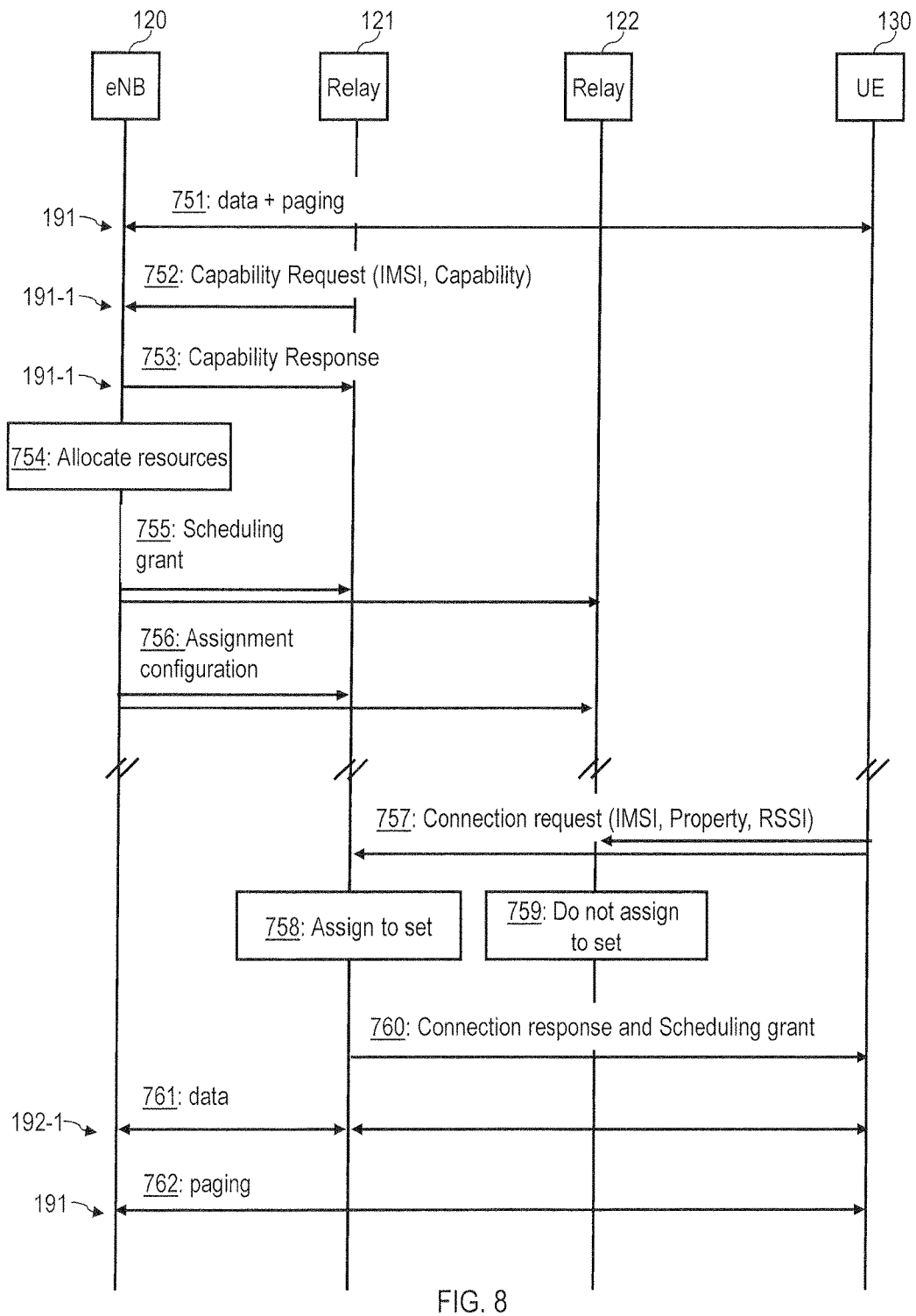
FIG. 8 is a signaling diagram illustrating signaling according to various embodiments.

In still further scenarios, it is possible that at least some parts of this logic resides within the respective relays 121-123. Turning to FIG. 8, a scenario is illustrated where the logic for assigning the UEs 130-136 to the various sets 151-153 resides within the relays 121-123. Here, 751-753 generally correspond to 701-703.

At 754, the access point node 120 allocates resources to the various sets 151-153. Providing the logic to allocate the reoccurring resources at the access point node 120 allows to conveniently determine orthogonal reoccurring resources for the various sets 151-153, thereby allowing to mitigate interference between the reoccurring resources associated with the various relaying channels 192, 192-1, 192-2. The access point node 120 also sends a respective scheduling grant 755 indicating the reoccurring resources; the scheduling grant 755 in the scenario of FIG. 8 is broadcasted and thus receives by, both, the relays 121, 122. In alternative implementations, two scheduling grants could be sent separately in two unicast transmissions.

Next, the access point node 120 sends an assignment configuration message 756 to each one of the relays 121, 122, e.g., employing a broadcast channel of the radio link 120 or employing the respective unicast direct channels 191-1 in between the access point node 120 and the relays 121, 122.

The assignment configuration message 756 indicates set classification information which parameterizes assignment of UEs 130-136 to the various sets 151-153. E.g., the set classification information may parameterize properties as illustrated above with respect to the connection request 704. E.g., the set classification information may parameterize at least one element selected from the group comprising: a MTC functionality of the respective UEs 130-136; a QoS requirement of the respective UEs 130-136; a category of the respective UEs 130-136; a location of the respective UEs 130-136 within the cellular network 100; a channel quality of the respective direct channel 191 between the respective UEs 130-136 and the access point node 120; a coverage requirement of the respective UEs 130-136; a channel quality of a frontend 192B of the respective relaying channel 192-1, 192-2 between the respective UEs 130-136 and the access point node 120.

Sometime later, the UE 130 sends the connection request 757 directly to the relays 121, 122, e.g., employing a D2D channel of the radio link 200. Based on the set classification information, the relays 121, 122 can autonomously judge whether the UE 130 has properties matching the specific set 151-153 associated with the corresponding relays 121, 122. By a comparison of the properties as indicated by the set classification information and the properties as indicated by the connection request 757, the relay 121 judges that the UE 130 should be assigned to the set 151 associated with the relaying channel 192-1 and the relay 121; likewise, the relay 122 judges that the UE 130 should not be assigned to the set 152 associated with the relaying channel 192-2 and relay 122. E.g., the relay 121 can be configured to compare the property as reported by the given UE 130 against the set classification information; if the reported property of the given UE 130 fulfills (does not fulfill) the indicated property of the set classification information, the relay 121 may assign (may not assign) the given UE 130 to the respective set 151. Hence, the relays 121, 122 selectively assign the UE 130 to the corresponding sets 151, 152 depending on, both, the set classification information indicated by the assignment configuration message 756 and the properties of the UE 130 indicated by the connection request 757.

Next, the relay 121 sends a connection response including a scheduling grant 760 to the UE 130 to indicate to the UE 130 that it has been assigned to the set 151 and should start communicating via the relaying channel 192-1 and the relay 121 using the respective reoccurring resources 261 as allocated at 754. Because of this, the UE 130 and the access point node 120 start to communicate via the relaying channel 192-1, 761. The direct channel 191 is maintained and operated in idle mode, 762.

With respect to FIG. 8, a scenario has been illustrated with the assignment configuration message 756 including the set classification information is provided by the access point node 120 to the relays 121, 122. In other scenarios, it would be possible that set classification information is manually configured, e.g., by a user of the relays 121, 122. In such a scenario, it is not required that the access point node 120 sends the assignment configuration message 756, as the set classification information is locally provided at the relays 121, 122. However, it is possible that the relays 121, 122 send an assignment report message (not shown in FIG. 8) to the access point node 120, the assignment report message including the manually configured set classification information, e.g., the UE 130 is manually assigned to the relay 122.

With respect to FIGS. 5-8, scenarios have been explained where the single UE 130 is assigned to the first and second sets 151, 152, respectively; in general it should be understood that each set 151-153 can comprise a plurality of UEs 130-136. In particular, those UEs 130-136 assigned to the same set 151-153 share the respective reoccurring resources 261-263. Where shared reoccurring resources 261-263 are employed, collision between data transmitted at the same time can occur; e.g., two UEs 130-136 assigned to the same set 151-153 may send data at the same time-frequency resource allocation 210. Here, it is possible that the eNB 130 and the respective UEs 130-136 execute a collision mitigation mechanism for data transmitted in the respective reoccurring resources 261-263. E.g., the collision mitigation mechanism can be selected from the group comprising: an Automatic Repeat Request scheme; Forward Error Correction; a carrier sense multiple access/collision detection; and/or orthogonal encoding.

Where only a small number of UEs 130-136 simultaneously send data in the same time-frequency resource allocation 210, orthogonally encoding the respective data can allow to successfully transmit the data. However, if too many UEs 130-136 simultaneously send data in the same time-frequency resource allocation 210, orthogonally encoding may not be able to avoid interference and loss of data.

Here, e.g. by means of legacy collision mitigation techniques, the UEs 130-136 can be configured to wait for acknowledgment of the previously sent data. Acknowledgments may include at least one of positive acknowledgments and negative acknowledgments. The acknowledgments can be used by the UE 130-136 to determine if sending of the data was successful, i.e., if the data has been successfully transmitted. In case no positive acknowledgment (ACK) is received and/or a negative acknowledgment (NACK) is received, the UE can resend the data. In order to avoid interference, it is possible to implement randomization of said resending of the data. E.g., a time-frequency resource allocation 210 for resending of the data can be randomly selected from the corresponding reoccurring resources 261-263.

In order to maintain resource fairness—i.e., preventing that some of the UEs 130-136 dominate resource usage, while other UEs 130-136 are excluded from resource usage—a random backoff mechanism can be used. In case successful transmission of data is not acknowledged, the UE 130-136 can wait for a certain random backoff time before resending the data. If, a certain number of attempts of resending the data, transmission remains unsuccessful, the UE can stop resending the data, wait for a new scheduling grant, or utilize alternative resources—such as dedicated resources allocated in response to a scheduling request for sending of the data.

The various scenarios and aspects discussed above with respect to FIGS. 5-8 may be combined with each other.

Figure 9:
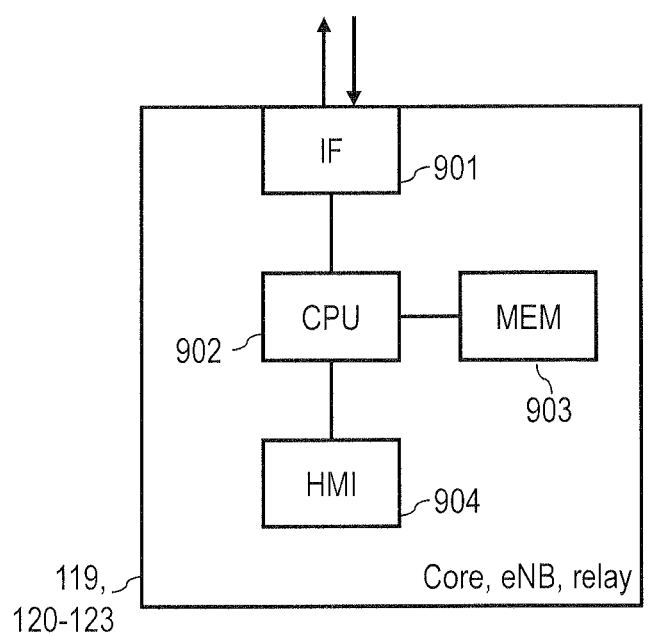
FIG. 9 schematically illustrates a node according to various embodiments.

FIG. 9 schematically illustrates a device that is configured to execute techniques as described herein. FIG. 9 is applicable to the node of the core network 119, the access point node 120 and the relays 121-123. The respective device 119-123 comprises a processor 902. E.g., the processor 902 can be a multicore processor. It is also possible to employ shared computing. Further, the device 119-123 comprises a memory 903, e.g., a non-volatile memory. The memory 903 comprises can stroll instructions that can be executed by the processor 902. Executing the control instructions causes the processor 902 to perform the techniques as illustrated above. E.g., the control instructions can cause the processor 902 to create the sets 151-153, allocate the corresponding reoccurring resources 261-263, and/or select between the created sets 151-153 when assigning a given UE 130-136 to the various sets 151-153. The device 119-123 further comprises an interface 901. The interface can send and/or receive data, e.g., by transceiving on the radio link 200. Further, the device 119-123 comprises a human machine interface (HMI) 904. The HMI 904 can input instructions from a user and/or output instructions to a user.

E.g., in case the relay functionality of the relays 121-123 is implemented by a UE, it would be possible that the user can selectively enable the relay functionality by inputting respective instructions via the HMI 904.

Figure 10:
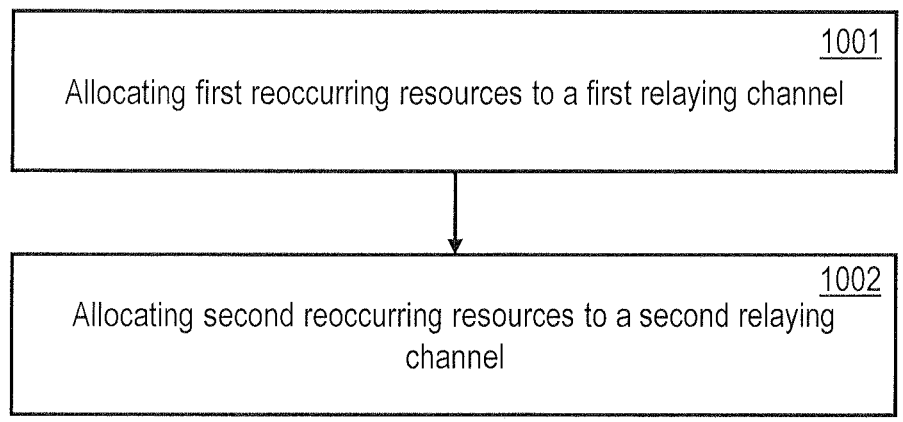
FIG. 10 is a flowchart of a method according to various embodiments

Executing the control instructions stored in the memory 903 can, e.g., cause the processor 902 to execute a method as illustrated in the flowchart of FIG. 10. First, the first reoccurring resources 261 are allocated to the first relaying channel 192-1, 1001. Next, the second reoccurring resources 262 are allocated to the second relaying channel 192-2, 1002.

It is then possible that corresponding scheduling grants are sent to the associated relays 121-123 (not shown in FIG. 10). Additionally to the allocating of the reoccurring resources 261-263, it is possible that the various UEs 130-136 are assigned to the sets 151-153. However, in other scenarios, set classification information indicating parameterized properties of the various UEs 130-136 can be provided to the various relays 121-123 such that the assignment of the UEs 130-136 to the various sets 151-153 can be executed by the relays 121-123.

Figure 11:
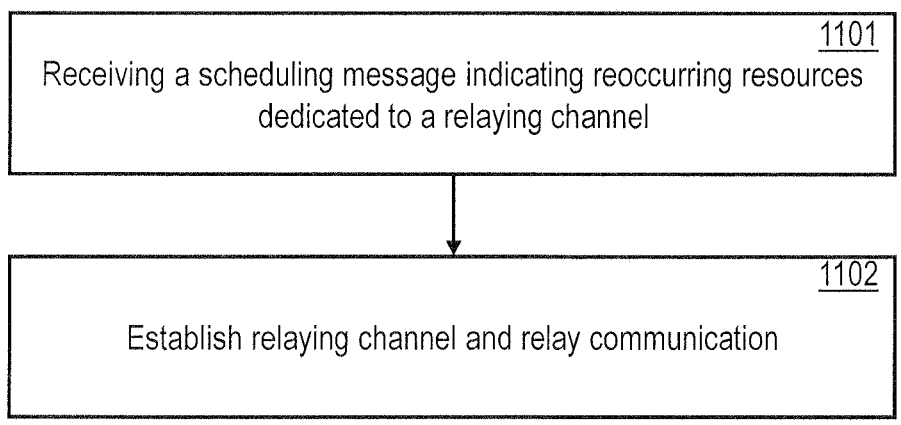
FIG. 11 is a flowchart of a method according to various embodiments

Executing the control instructions stored in the memory 903 can, e.g., cause the processor 902 to execute a method as illustrated in the flowchart of FIG. 11. First, a scheduling message is received which indicates reoccurring resources dedicated to the relaying channel 192, 192-1, 192-2, 1101. The reoccurring resources 261-263 being dedicated to the relaying channel 192, 192-1, 192-2 can correspond to the reoccurring resources 261-263 being orthogonal to further reoccurring resources dedicated to further relaying channel's 192, 192-1, 192-2.

Then, at 1102, the relaying channel 192, 192-1, 192-2 is established and communication on the relaying channel 192, 192-1, 192-2 is relayed.

In various scenarios it would also be possible that based on set classification information and properties as reported by a given one of the UEs 130-136, the given one of the UEs 130-136 is selectively assigned to the respective set 151-153 associated with the reoccurring resources as indicated by the scheduling message of 1101.

Summarizing, above techniques have been illustrated which enable UEs such as MTC devices to communicate on an additional relaying channel with a cellular network. The additional relaying channel is in addition to a direct channel between the respective UE and the cellular network. In various scenarios, the relaying channel is established by a UE implementing relaying functionality; as such, the UE implementing the relaying functionality may be seen as an access point node with comparably limited operation.

By relying on the relaying channel, it is possible to achieve a comparably high channel quality of the relaying channel; this is because the relaying channel may rely on shorter radio signal paths if compared to the direct channel. By this, a transmit power may be reduced resulting in energy efficient operation of the UE. The battery lifetime of the UE may be prolonged.

Further, different relaying channels are associated with different reoccurring resources that are orthogonal to each other. Thereby, interference in between various relaying channels can be mitigated.

As can be seen, the grouping of UEs into different sets is done in a hierarchical manner where sets are defined on a per-relay basis. First layer of hierarchy: Orthogonal resources are allocated to different relaying channels such that inter-channel interference is mitigated. Second layer of hierarchy: UEs of single set share reoccurring resources; the UEs are assigned to the set based on properties that promise efficient utilization of the shared reoccurring resources; thus, intra-channel interference is mitigated.

Still further, the different relaying channels/the different reoccurring resources are associated with different sets to which the UEs are assigned. Assignment of UEs to the sets can depend on various properties including, but not limited to: a traffic pattern of the respective UEs; a feature capability of the respective UEs; a QoS requirement of the respective UEs, etc. Thereby, it can be assured that within a given set the corresponding associated reoccurring resources are efficiently used by the assigned UEs.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

While above various techniques have been described primarily with respect to the MTC technology and in the framework of the Internet of Things, it should be understood that such techniques may be readily applied to different types and kinds of cellular networks.

The invention claimed is:

1. A node of a cellular network, comprising:
an interface configured to communicate with a plurality of communication devices attached to the cellular network via a radio link, and
at least one processor configured to allocate first reoccurring time-frequency resources to some of the plurality of communication devices that are assigned to a first set and on the radio link of the cellular network to a first relaying channel, the first relaying channel being established via a first relaying node and between an access point node of the cellular network and the some of the plurality of communication devices that are assigned to the first set,
wherein the at least one processor is further configured to allocate second reoccurring time-frequency resources to some of the plurality of communication devices that are assigned to a second set and on the radio link of the cellular network to a second relaying channel, the second relaying channel being established via a second relaying node and between the access point node of the cellular network and the some of the plurality of communication devices that are assigned to the second set,
wherein at least one of the first relaying node or the second relaying node is a user equipment (UE) selected from the plurality of communication devices,
wherein the first reoccurring time-frequency resources are shared between the communication devices assigned to the first set such that collision may occur between multiple communication devices of the first set attempting to transmit at the same time-frequency resource,
wherein the second reoccurring time-frequency resources are shared between the communication devices assigned to the second set such that collision may occur between multiple communication devices of the second set attempting to transmit at the same time-frequency resource,
wherein the at least one processor is configured to receive, via the interface, a connection message, the connection message indicating a given one of the plurality of communication devices,
wherein the at least one processor is configured to assign the given one of the plurality of communication devices to the first set or the second set in response to receiving the connection message,
wherein the connection message further indicates at least one element selected from the group comprising:

a Machine Type Communication functionality of the given one of the plurality of communication devices; and a traffic pattern of the given one of the plurality of communication devices, wherein the traffic pattern corresponds to a periodicity or frequency of occurrence with which data to be transmitted is expected to occur, a size of individual data blocks to be transmitted, an overall size of data, or peak times for data to be transmitted; and wherein the at least one processor is configured to assign the given one of the plurality of communication devices to the first set or the second set depending on the indicated at least one element.

2. The node of claim 1, wherein the at least one processor is configured to send, via the interface to the first relaying node, a first scheduling message, the first relaying node being configured to establish the first relaying channel, the first scheduling message indicating the first reoccurring time-frequency resources, wherein the at least one processor is configured to send, via the interface to the second relaying node, a second scheduling message, the second relaying node being configured to establish the second relaying channel, the second scheduling message indicating the second reoccurring time-frequency resources.

3. The node of claim 2, wherein the at least one processor is configured to receive, via the interface from the first relaying node, a first capability message, the first capability message indicating a capability of the first relaying node to establish the first relaying channel, wherein the at least one processor is configured to receive, via the interface from the second relaying node, a second capability message, the second capability message indicating a capability of the second relaying node to establish the second relaying channel, wherein said allocating of the first reoccurring time-frequency resources is in response to receiving the first capability message, wherein said allocating of the second reoccurring time-frequency resources is in response to receiving the second capability message.

4. The node of claim 2, wherein the node is the access point node configured to wirelessly transceive on the radio link, wherein the at least one processor is configured to communicate, via the interface with the at least one of the first relaying node and the second relaying node, on a direct channel of the radio link.

5. The node of claim 1, wherein the node is the access point node of the cellular network configured to wirelessly transceive on the radio link, wherein the at least one processor is configured to communicate, via the interface with the communication devices assigned to the first set, on the first relaying channel, wherein the at least one processor is configured to communicate, via the interface with the communication devices assigned to the second set, on the second relaying channel.

6. The node of claim 1, wherein the at least one processor is configured to communicate, via the interface with the communication devices assigned to the first set and with the communication devices assigned to the second set, on respective direct channels of the radio link in an idle mode.

7. The node of claim 1, wherein the connection message further indicates a channel quality of a frontend of at least one of the first relaying channel and the second relaying channel, wherein the at least one processor is configured to assign the given one of the plurality of communication devices to the first set or the second set depending on the indicated channel quality of the at least one of the first relaying channel and the second relaying channel.

8. The node of claim 7, wherein the at least one processor is configured to monitor the channel quality of the frontend of the at least one of the first relaying channel and the second relaying channel in response to allocating the first reoccurring time-frequency resources and the second reoccurring time-frequency resources.

9. The node of claim 1, wherein the at least one processor is configured to establish set classification information for the first set and the second set, wherein the set classification information parameterizes assignment of communication devices to the first set and the second set, wherein the at least one processor is configured to send, via the interface to the first relaying node and the second relaying node, at least one assignment configuration message indicating the set classification information.

10. The node of claim 1, wherein the first reoccurring time-frequency resources are orthogonal to the second reoccurring time-frequency resources.

11. A relaying node of a cellular network, comprising:

an interface configured to communicate with a node of the cellular network via a radio link of the cellular network and further configured to communicate with some of a plurality of communication devices attached to the cellular network via the radio link, at least one processor configured to receive, via the interface from the node, a scheduling message, the scheduling message indicating reoccurring time-frequency resources allocated to some of the plurality of communication devices assigned to a set and a relaying channel of the radio link, the relaying channel being between an access point node of the cellular network and the some of the plurality of communicating devices that are assigned to the set, the reoccurring time-frequency resources being shared between the communication devices assigned to the set such that collision may occur between multiple communication devices of the set attempting to transmit at the same time-frequency resource, wherein the at least one processor is configured to establish the relaying channel via the relaying node and to relay communication between the access point node of the cellular network and the communication devices assigned to the set on the relaying channel, wherein the relaying node is a user equipment (UE) selected from the plurality of communication devices, wherein the at least one processor is configured to receive, via the interface from a given one of the plurality of communication devices, a connection message indicating the given one of the plurality of communication devices, wherein the connection message further indicates at least one element selected from the group comprising:
- a Machine Type Communication functionality of the given one of the plurality of communication devices; and
- a traffic pattern of the given one of the plurality of communication devices, wherein the traffic pattern corresponds to a periodicity or frequency of occurrence with which data to be transmitted is expected to occur, a size of individual data blocks to be transmitted, an overall size of data, or peak times for data to be transmitted; and wherein the at least one processor configured to selectively assign the given one of the plurality of communication devices to the set depending on the indicated at least one element.

12. The relaying node of claim 11,
wherein the relaying node is configured to send, via the interface to the node, a capability message, the capability message indicating a capability of the relaying node to establish the relaying channel.

13. The relaying node of claim 11,
wherein the at least one processor is configured to communicate, via the interface with the access point node of the cellular network, on a direct channel of the radio link.

14. The relaying node of claim 11,
wherein the at least one processor is configured to receive, via the interface from the node, an assignment configuration message, the assignment configuration message indicating set classification information, the set classification information parameterizing assignment of communication devices to the set, wherein the at least one processor is configured to assign a given one of the plurality of communication devices to the set depending on the set classification information, wherein the set classification information parameterizes at least one element selected from the group comprising:
- a Machine Type Communication functionality of the given one of the plurality of communication devices; and
- a traffic pattern of the given one of the plurality of communication devices, wherein the traffic pattern corresponds to a periodicity or frequency of occurrence with which data to be transmitted is expected to occur, a size of individual data blocks to be transmitted, an overall size of data, or peak times for data to be transmitted;

wherein the at least one processor is configured to selectively assign the given one of the plurality of communication devices to the set depending on a comparison between the indicated at least one element of the connection message and the at least one element parametrized by the set classification information.

* * * * *